(12) United States Patent
Kihira et al.

(10) Patent No.: US 10,142,000 B2
(45) Date of Patent: Nov. 27, 2018

(54) ANTENNA APPARATUS

(71) Applicant: Mitsubishi Electric Corporation, Tokyo (JP)

(72) Inventors: Kazunari Kihira, Tokyo (JP); Makoto Matsuki, Tokyo (JP); Hikaru Watanabe, Tokyo (JP); Hiroki Iura, Tokyo (JP); Masataka Otsuka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/562,784

(22) PCT Filed: Apr. 15, 2015

(86) PCT No.: PCT/JP2015/061615
§ 371 (c)(1),
(2) Date: Sep. 28, 2017

(87) PCT Pub. No.: WO2016/166851
PCT Pub. Date: Oct. 20, 2016

(65) Prior Publication Data
US 2018/0287678 A1 Oct. 4, 2018

(51) Int. Cl.
*H04B 7/04* (2017.01)
*H04B 7/06* (2006.01)
(Continued)

(52) U.S. Cl.
CPC ......... *H04B 7/0617* (2013.01); *H04B 7/0408* (2013.01); *H04B 7/0452* (2013.01); *H04B 7/0697* (2013.01)

(58) Field of Classification Search
CPC .. H04B 7/0408; H04B 7/0452; H04B 7/0617; H04B 7/0691; H04B 7/0697; H01Q 3/26
See application file for complete search history.

(56) References Cited

U.S. PATENT DOCUMENTS 7,414,578 B1 * 8/2008 Courtade ............... G01S 3/023
342/372
2002/0132600 A1 9/2002 Rudrapatna
(Continued)

FOREIGN PATENT DOCUMENTS

JP  H10-209734 A  8/1998
JP  2002-076743 A  3/2002
(Continued)

OTHER PUBLICATIONS

Written Opinion issued in PCT/JP2015/061615; dated Jul. 7, 2015.
(Continued)

*Primary Examiner* — Bernarr E Gregory
*Assistant Examiner* — Fred H Mull
(74) *Attorney, Agent, or Firm* — Studebaker & Brackett PC (57) ABSTRACT

A sub-array number determinator is provided to determine a number of sub-arrays to be allocated to each of user terminals detected by a terminal position detector on a basis of relation between positions of the user terminals and a position of an antenna apparatus. An antenna selector selects sub-arrays for the number determined by the sub-array number determinator from among the sub-arrays and allocates the selected sub-arrays for the determined number to each of the user terminals. This structure is capable of preventing interference among beams for user terminals and providing excellent communication quality to the user terminals even in condition where the user terminals are adjacent to each other.

7 Claims, 6 Drawing Sheets

(51) Int. Cl.
*H04B 7/0452* (2017.01)
*H04B 7/0408* (2017.01)

(56) References Cited

U.S. PATENT DOCUMENTS

| | | |
|---|---|---|
| 2012/0046001 A1 | 2/2012 | Inoue et al. |
| 2015/0056932 A1* | 2/2015 | Doi .................... H04B 7/0417 |
| | | 455/69 |

FOREIGN PATENT DOCUMENTS

| | | |
|---|---|---|
| JP | 2002-290148 A | 10/2002 |
| JP | 2005-136492 A | 5/2005 |
| JP | 2012-044408 A | 3/2012 |
| JP | 5066234 B2 | 11/2012 |

OTHER PUBLICATIONS

International Search Report issued in PCT/JP2015/061615; dated Jul. 7, 2015.
Tatsunori Obara et al.; "Joint Fixed Beamforming and Eigenmode Precoding on Super High Bit Rate Massive MIMO Transmission Using Higher Frequency Bands"; IEICE Technical Report; RCS 2013-349; Mar. 2014; pp. 259-264.
Akihiro Okazaki et al.; "A Study on Next-Generation Wireless Access with Higher Frequency Bands"; IEICE Technical Report; RCS 2014-81; Jun. 2014; pp. 287-292.
Wonil Roh et al.; "Millimeter-Wave Beamforming as an Enabling Technology for 5G Cellular Communications: Theoretical Feasibility and Prototype Results"; IEEE Communications Magazine; Feb. 2014; pp. 106-113; vol. 52, No. 2.

\* cited by examiner

ANTENNA APPARATUS

TECHNICAL FIELD

The present invention relates to an antenna apparatus used in, for example, a wireless communication base station.

BACKGROUND ART

In mobile communication systems, Massive MIMO (Multiple-Input Multiple-Output) attracts attention as technology of realizing high-speed and high-capacity transmission.

The Massive MIMO means multi-user MIMO transmission for transmitting a plurality of streams by using an extremely large number of element antennas. The Massive MIMO is implemented by, for example, installing in each base station an array antenna constituted by a large number of element antennas, and performing beam forming in addition to stream multiplexing.

The structure of digital massive MIMO, in which a digital to analog converter (DAC) being a digital-analog converter and other analog components are connected to all the element antennas and also a digital circuit is connected, is capable of obtaining a degree of freedom for the number of element antennas, which results in very high transmission performance.

However, the digital massive MIMO has problems in manufacturing cost and computational amount. Therefore, an antenna apparatus has been proposed, which reduces a circuit scale by forming an analog beam by using a phase shifter.

With regard to the antenna apparatus described above, a full-array system (for example, Non-Patent Literature 1), which refers to a method of forming a plurality of beams by using all element antennas, is capable of obtaining high antenna gain. However, in order to form the beams, a forming unit of the analog beam in this system may become complicated. Thus, there are problems in terms of manufacturing and cost.

On the other hand, in a sub-array system (for example, Non-Patent Literatures 2 and 3), which refers to a method using different element antennas for each beam, the structure of hardware is simpler than that of the full-array system, and arrangement of each sub-array and the like may be flexibly changed.

Patent Literature 1 mentioned below presents a proposal that a configuration to change size of antenna to be used (sub-array size) in dependence on a plurality of transmission modes including the MIMO.

CITATION LIST

Patent Literature 1: Japanese Patent Application Laid-Open No. 2012-44408

Non-Patent Literature 1: Obara, Suyama, Shen, Okumura, "Joint Fixed Beamforming and Eigenmode Precoding on Super High Bit Rate Massive MIMO Transmission Using Higher Frequency Bands," IEICE Technical Report, RCS 2014-349, March 2014

Non-Patent Literature 2: Okazaki, Iura, Fukui, Take, Okamura "A Study on Next-Generation Wireless Access with Higher Frequency Bands," IEICE Technical Report, RCS 2014-81, June 2014

Non-Patent Literature 3: W. Roh et. al., "Millimeter-Wave Beamforming as an Enabling Technology for 5G Cellular Communications: Theoretical Feasibility and Prototype Results," IEEE Commun. Mag., vol. 52, no. 2, pp. 106-113, February 2014

SUMMARY OF INVENTION

Since the conventional antenna apparatus is configured as described above, there is an advantage that the arrangement of each sub-array may be flexibly changed when using the sub-array system as compared to a case of using the full-array system. However, in a case where the number of element antennas is the same between the sub-array system and the full-array system, the sub-array system decreases in the number of element antennas per a beam, bringing disadvantage in terms of antenna gain. Therefore, in contrast to a case of using the full-array system, the sub-array system causes a problem that communication quality for the user terminal, which is located far away, might be deteriorated.

The Patent Literature 1 discloses the technology of renewing an antenna size by changing the number of element antennas to be used depending on communication environment. However, it does not disclose the technology of renewing the antenna size for each user terminal in consideration of a positional relation among the user terminals in the communication environment where there is a plurality of user terminals. Therefore, in condition where a plurality of user terminals is adjacent to each other, there is a problem that beams for the user terminals may interfere with each other, and thus the communication quality is deteriorated.

The present invention has been made to solve the above-described problem, and an object thereof is to obtain an antenna apparatus which is capable of providing excellent communication quality for a plurality of user terminals.

An antenna apparatus according to the present invention includes: a plurality of sub-arrays each of which is constituted by a plurality of element antennas; a terminal position detector to detect positions of a plurality of user terminals being communication objects; a sub-array number determinator to determine a number of sub-arrays to be allocated to each of the plurality of user terminals detected by the terminal position detector on a basis of relation between the positions of the plurality of user terminals and a position of the antenna apparatus; and an antenna selector to select sub-arrays for the number determined by the sub-array number determinator from among the plurality of sub-arrays and allocate the selected sub-arrays for the determined number to each of the plurality of user terminals.

According to the present invention, a sub-array number determinator is provided to determine a number of sub-arrays to be allocated to each of user terminals detected by a terminal position detector on a basis of relation between positions of the user terminals and a position of an antenna apparatus, and an antenna selector selects sub-arrays for the number determined by the sub-array number determinator from among the sub-arrays and allocates the selected sub-arrays for the determined number to each of the user terminals. Therefore, there is an effect that excellent communication quality is provided for a plurality of terminals.

DESCRIPTION OF EMBODIMENTS

In order to describe the present invention in more detail, embodiments for carrying out the present invention are hereinafter described with reference to the attached drawings.

Embodiment 1

Figure 1:
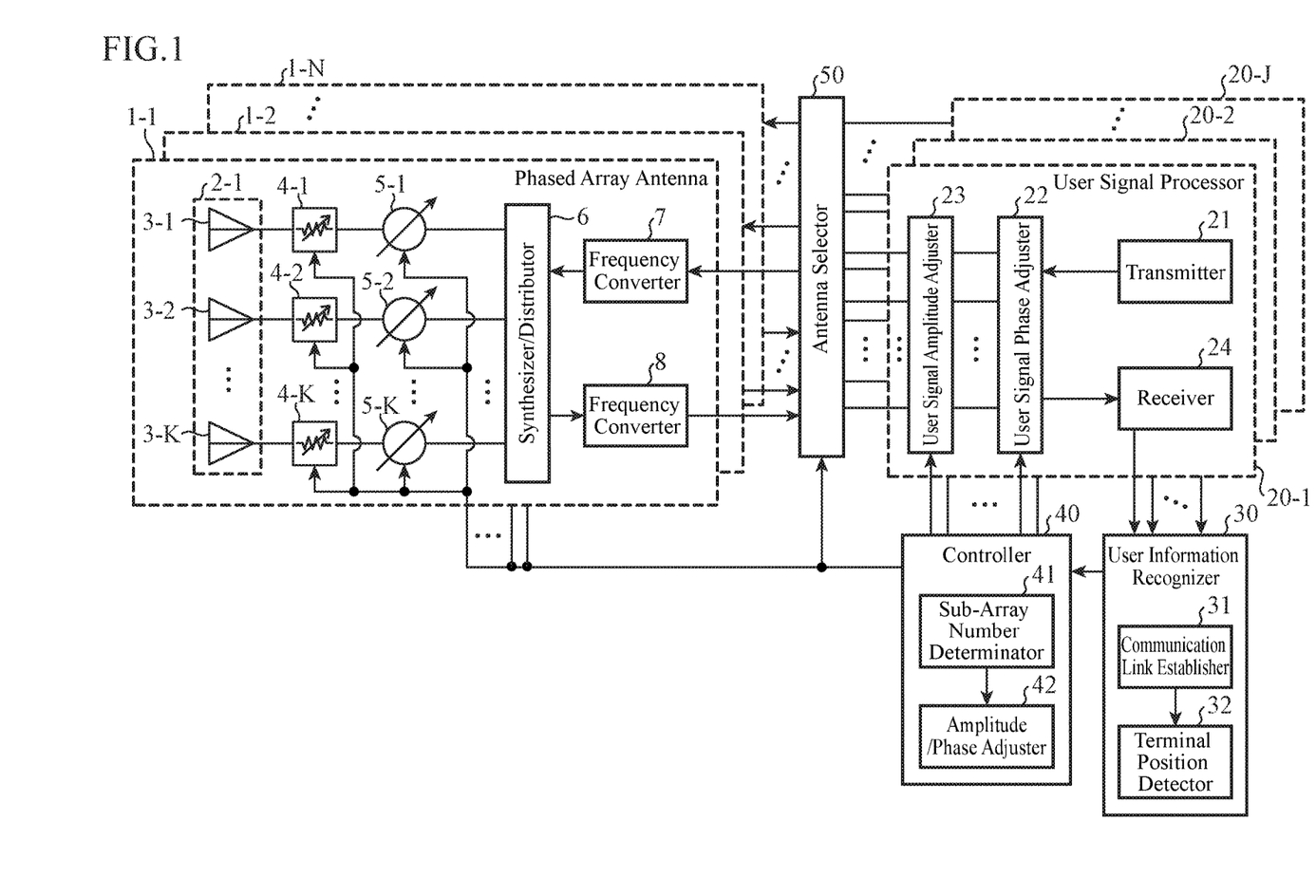
FIG. 1 is a configuration diagram illustrating an antenna apparatus according to Embodiment 1 of the present invention.

FIG. 1 is a configuration diagram illustrating an antenna apparatus according to Embodiment 1 of the present invention. An antenna apparatus shown in FIG. 1 is provided with N phased array antennas 1 (N is an integer equal to or more than 2). Phased array antennas 1-1 to 1-N have the same configuration as each other.

In FIG. 1, a sub-array 2-$n$ ($n$=1, 2, ..., N) mounted on the phased array antenna 1-$n$ is constituted by K element antennas (K is an integer equal to or more than 2). That is, the sub-array 2-$n$ is constituted by element antennas 3-1 to 3-K.

In FIG. 1, since the sub-arrays 2-2 to 2-N are hidden behind the phased array antenna 1-1, they are not illustrated.

Note that, in FIG. 1, only elements necessary for the present invention are illustrated, and individual devices required for a transceiver, such as an amplifier and a filter, are omitted.

An amplitude adjuster 4-$k$ ($k$=1, 2, ..., K) is connected to the element antenna 3-$k$ and adjusts amplitude of a signal transmitted/received by the element antenna 3-$k$.

A phase shifter 5-$k$ ($k$=1, 2, ..., K) is connected to the amplitude adjuster 4-$k$ and adjusts a phase of the signal transmitted/received by the element antenna 3-$k$.

When transmitting a signal, a synthesizer/distributor 6 distributes a high-frequency signal output by a frequency converter 7 into K pieces and output the distributed high-frequency signals to the phase shifters 5-1 to 5-K. When signals are received, the synthesizer/distributor 6 synthesizes the received signals whose phases have been adjusted by the phase shifters 5-1 to 5-K and outputs the synthesized signal to a frequency converter 8.

The frequency converter 7 performs a D/A conversion process of converting a modulated signal output by an antenna selector 50 into an analog signal, performs a frequency conversion process of converting the analog signal into the high-frequency signal, and outputs the high-frequency signal to the synthesizer/distributor 6.

An example is herein presented, in which the modulated signal is converted into the high-frequency signal after the conversion into the analog signal. Alternatively, the modulated signal may be converted into the high-frequency signal before the conversion into the analog signal.

The frequency converter 8 performs a frequency conversion process of converting a frequency of the synthesized signal output from the synthesizer/distributor 6 into an intermediate frequency. The frequency converter 8 further performs an A/D conversion process of converting the synthesized signal after the frequency conversion into a digital signal, and outputs to the antenna selector 50 a reception signal being a digital synthesized signal.

An example is herein presented, in which the synthesized signal is converted into the digital signal after the conversion of the frequency of the synthesized signal into the intermediate frequency. Alternatively, the synthesized signal is converted into the digital signal before the conversion of the frequency of the synthesized signal into the intermediate frequency.

A user signal processor 20 is a processor for performing data communication with a user terminal being a communication object on one-to-one correspondence.

In the Embodiment 1, J user signal processors 20 (J is an integer equal to or more than 2) are provided so that the data communication can be performed with J user terminals at a maximum. That is, user signal processors 20-1 to 20-J are provided, and the user signal processors 20-1 to 20-J have the same configuration.

A transmitter 21 of each of the user signal processors 20-1 to 20-J performs a process of generating the modulated signal by using data to be transmitted to the user terminal being the communication object and outputting the modulated signal to a user signal phase adjuster 22.

The user signal phase adjuster 22 performs a process of distributing the modulated signal output from the transmitter 21 into M signals (M is an integer equal to or less than N) and adjusting the phases of the M modulated signals. Note that the distribution of the modulated signal into the M signals is intended to copy the modulated signal and generate M identical modulated signals.

In addition, the user signal phase adjuster 22 performs a process of adjusting the phases of the M reception signals output from a user signal amplitude adjuster 23, synthesizing the M reception signals after the phase adjustment, and outputting the synthesized reception signal to the receiver 24.

The user signal amplitude adjuster 23 performs a process of adjusting the amplitude of the M modulated signals after the phase adjustment output from the user signal phase adjuster 22 and outputting to the antenna selector 50 the M modulated signals after the amplitude adjustment.

In addition, the user signal amplitude adjuster 23 performs a process of adjusting the amplitude of the M reception signals output from the antenna selector 50 and outputting to the user signal phase adjuster 22 the M reception signals after the amplitude adjustment.

A receiver 24 performs a demodulating process on the synthesized reception signal output from the user signal phase adjuster 22 and demodulates the data transmitted by the user terminal being the communication object.

A user information recognizer 30 is constituted by a communication link establisher 31 and a terminal position detector 32.

Prior to starting individual data communication with a plurality of user terminals, the communication link establisher 31 performs a process of establishing a communication link with the user terminals by using, for example, a common control channel and detecting the user terminal which wishes to start the individual data communication.

Note that the common control channel may be set by using at least one or more phased array antennas 1 from among the phased array antennas 1-1 to 1-N or by using a control antenna and the like, which is other than the phased array antennas 1-1 to 1-N.

The terminal position detector 32 performs a process of detecting a position of the user terminal by collecting, from the user terminal detected by the communication link establisher 31, positional information indicating the position of the corresponding terminal.

A controller 40 is constituted by a sub-array number determinator 41 and an amplitude/phase adjuster 42.

The sub-array number determinator 41 performs a process of determining the number of sub-arrays to be allocated to a plurality of user terminals on a basis of relation between the positions of the user terminals detected by the terminal position detector 32 and a position of the antenna apparatus.

That is, the sub-array number determinator 41 specifies angular difference between the user terminals, which is viewed from the antenna apparatus, on the basis of the relation between the positions of the user terminals detected by the terminal position detector 32 and the position of the antenna apparatus, and determines the number of sub-arrays to be allocated to each of the user terminals from the angular difference.

The amplitude/phase adjuster 42 performs a process of adjusting the amplitude of the signal to be transmitted/received by the element antenna 3-$k$ constituting the sub-array 2 by controlling the amplitude adjuster 4-$k$ ($k$=1, 2, . . . , K) and the user signal amplitude adjuster 23 and adjusting the phase of the signal transmitted/received by the element antenna 3-$k$ constituting the sub-array 2 by controlling the phase shifter 5-$k$ and the user signal phase adjuster 22.

When the number of sub-arrays determined by the sub-array number determinator 41 is M (M is an integer equal to or less than N), the antenna selector 50 performs a process of selecting M sub-arrays 2 from among the sub-arrays 2-1 to 2-N.

In addition, the antenna selector 50 performs a process of allocating the M sub-arrays 2 to each of the user terminals detected by the communication link establisher 31 as antennas used for the individual data communication with the user terminals.

In an example in FIG. 1, it is assumed that each of the user signal processors 20-1 to 20-J, the user information recognizer 30, the controller 40, and the antenna selector 50, which are digital processors of the antenna apparatus, is constituted by dedicated hardware. As the dedicated hardware, for example, a semiconductor integrated circuit on which a CPU is mounted, a one-chip microcomputer and the like may be considered.

Alternatively, the digital processor of the antenna apparatus may be constituted by a computer.

Figure 2:
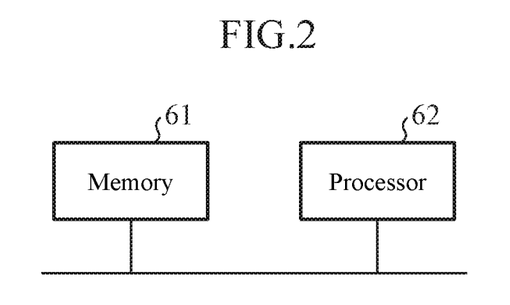
FIG. 2 is a hardware configuration diagram when a digital processor of the antenna apparatus is constituted by a computer.

FIG. 2 is a hardware configuration diagram when the digital processor of the antenna apparatus is constituted by the computer.

In the case where the digital processor of the antenna apparatus is constituted by the computer, a program describing processing contents of the user signal processors 20-1 to 20-J, the user information recognizer 30, the controller 40, and the antenna selector 50 may be stored in a memory 61 of the computer and a processor 62 of the computer may execute the program stored in the memory 61.

Figure 3:
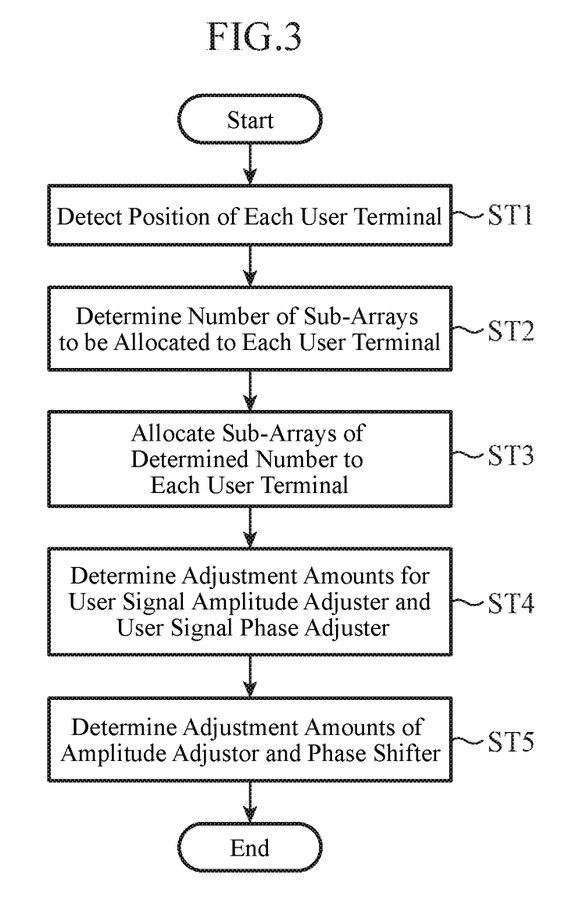
FIG. 3 is a flowchart illustrating processing contents of the digital processor of the antenna apparatus.

FIG. 3 is a flowchart illustrating the processing contents of the digital processor of the antenna apparatus.

Figure 4:
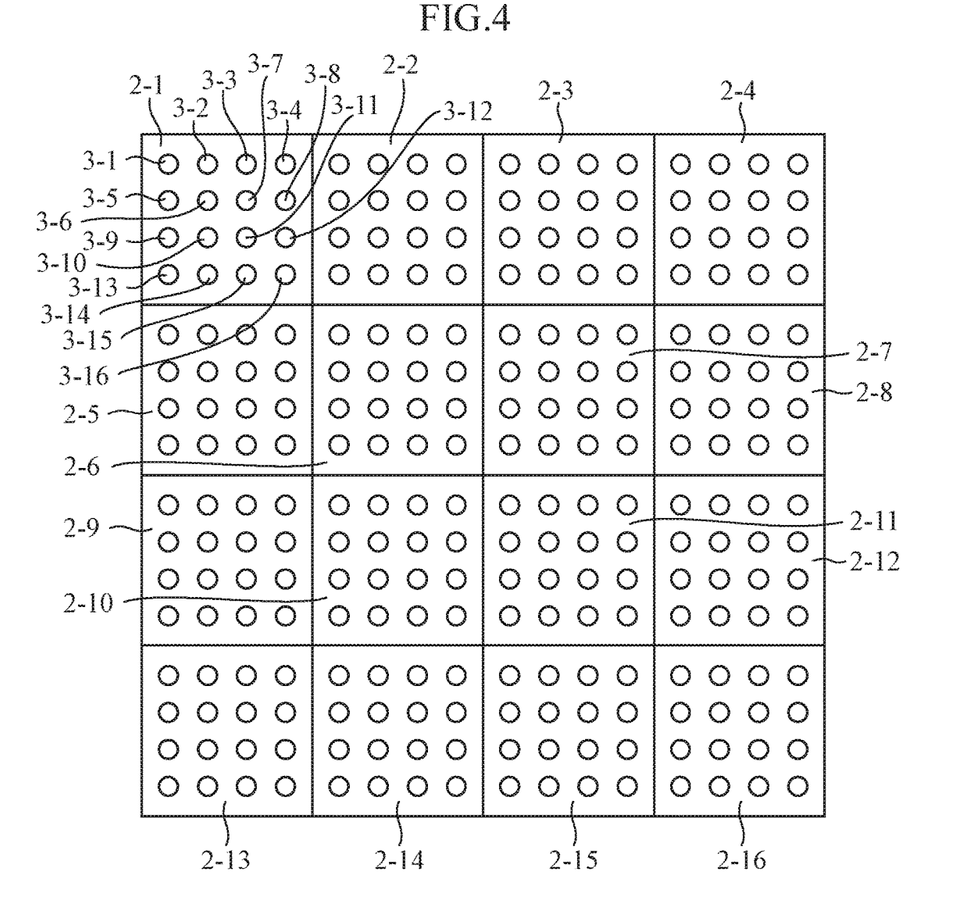
FIG. 4 is an illustration diagram illustrating an antenna structure when N=16 is given.

FIG. 4 is an illustration diagram illustrating an antenna structure when N=16 is given.

FIG. 4 illustrates an example in which a planar antenna is constituted by the sub-arrays 2-1 to 2-16 with 4×4 array.

Each of the sub-arrays 2-1 to 2-16 is constituted by 16 element antennas 3-1 to 3-16 with 4×4 array. Each of the element antennas 3-1 to 3-16 constituted by, for example, a patch antenna and the like.

In general, a single sub-array 2 takes charge of a single user terminal. Accordingly, in the example in FIG. 4, the single sub-array 2 is able to take charge of 16 user terminals at the maximum. However, when distance between the user terminals becomes shorter, beams formed by the respective sub-arrays 2 partially overlap with each other, so that beam interference may occur.

In this case, it is difficult to perform data communication with the user terminals adjacent to each other. Therefore, in the Embodiment 1, the beam width is narrowed by setting the number of sub-arrays 2, which are used for data communication per a single user terminal, to two or more so that the user terminals adjacent to each other may prevent the beams from interference with each other.

For example, in a case of using a total of four sub-arrays 2 (2×2 array), the beam width in a horizontal direction and the beam width in a vertical direction are halved as compared with a case in which one sub-array 2 is used, and separation performance of the user terminals is enhanced as the beam width is narrower.

In addition, when a plurality of sub-arrays 2 is used, an antenna gain is improved. Therefore, it becomes possible to take charge of the user terminal located far away and communication coverage depending on an installation environment may be formed.

For example, in a case of using a total of four sub-arrays 2 (2×2 array), an antenna aperture is quadrupled as compared with a case in which one sub-array 2 is used. Thus, the antenna gain is quadrupled, and a communication distance becomes approximately 2.4 times in a line-of-sight communication environment.

Operation is next described.

Prior to starting individual data communication with a plurality of user terminals, the communication link establisher 31 of the user information recognizer 30 establishes a communication link together with the user terminals by using, for example, the common control channel.

Upon establishing the communication link with the user terminals, the communication link establisher 31 simultaneously transmits, to the user terminals by using the common control channel, an inquiry signal inquiring whether to start the data communication.

Upon receiving the inquiry signal, each of the user terminals returns a response signal to the inquiry signal to the antenna apparatus by using the common control channel when wanting to start the data communication.

Note that it is assumed that the response signal includes the positional information indicating the position of the user terminal and a terminal ID for identifying the user terminal. The position of the user terminal may be detected, for example, from a GPS signal received by a GPS receiver mounted on the user terminal.

Although an example of establishing the communication link with a plurality of user terminals by using the common control channel is herein illustrated, this is merely an example. Alternatively, for example, it is possible to establish the communication link together with a plurality of user terminals by using individual control channels.

Upon receiving the response signal including the positional information and the terminal ID, the communication link establisher 31 recognizes the user terminal which wants to start the data communication from the terminal ID included in the response signal.

When there is the user terminal which wants to start the data communication, the communication link establisher 31 outputs to the terminal position detector 32 the response signal transmitted by the user terminal.

In the Embodiment 1, for simplifying the description, it is assumed that two user terminals $T_1$ and $T_2$ want to start the data communication, and that the response signals transmitted by the two user terminals $T_1$ and $T_2$ are output to the terminal position detector 32.

Upon getting the two response signals from the communication link establisher 31, the terminal position detector 32 refers to the positional information included in the two response signals and detects the positions of the two user terminals $T_1$ and $T_2$ which want to start the data communication (step ST1 in FIG. 3).

The sub-array number determinator 41 of the controller 40 stores in advance the position of the antenna apparatus. When the terminal position detector 32 detects the positions of the two user terminals $T_1$ and $T_2$, the sub-array number determinator 41 specifies angular difference θ between the two user terminals $T_1$ and $T_2$ viewed from the antenna apparatus on the basis of relation between the positions of the two user terminals $T_1$ and $T_2$ and the position of the antenna apparatus.

A viewing angle $\theta_{AZ}$ in an azimuth angle direction and a viewing angle $\theta_{EL}$ in an elevation angle direction are assumed as the angular difference θ between the two user terminals $T_1$ and $T_2$ viewed from the antenna apparatus.

Figure 5:
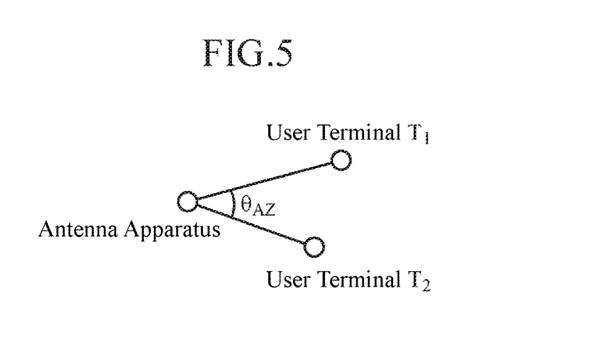
FIG. 5 is an illustration diagram illustrating a viewing angle in an azimuth angle direction.

FIG. 5 is an illustration diagram illustrating the viewing angle in the azimuth angle direction. In FIG. 5, $\theta_{AZ}$ represents the viewing angle in the azimuth angle direction, and circles represent the positions (latitude and longitude) of the antenna apparatus and the two user terminals $T_1$ and $T_2$.

Upon specifying the viewing angle $\theta_{AZ}$ in the azimuth angle direction and the viewing angle $\theta_{EL}$ in the elevation angle direction as the angular difference θ between the two user terminals $T_1$ and $T_2$ viewed from the antenna apparatus, the sub-array number determinator 41 determines the number of sub-arrays 2 in the azimuth angle direction to be allocated to each of the two user terminals $T_1$ and $T_2$ on the basis of the viewing angle $\theta_{AZ}$ in the azimuth angle direction, and also determines the number of sub-arrays 2 in the elevation angle direction to be allocated to each of the two user terminals $T_1$ and $T_2$ on the basis of the viewing angle $\theta_{EL}$ in the elevation angle direction (step ST2).

The sub-array number determinator 41 increases the number of sub-arrays 2 to be allocated to each of the two user terminals $T_1$ and $T_2$ as the angular difference θ between the two user terminals $T_1$ and $T_2$ is narrower. Specifically, the number of sub-arrays 2 in the azimuth angle direction and that in the elevation angle direction are determined in the manner described below.

Herein, for convenience of description, it is assumed that the amplitude of the signals transmitted/received by the element antennas 3-1 to 3-16 constituting each of the sub-arrays 2-1 to 2-16, respectively, is adjusted by the amplitude adjusters 4-1 to 4-16 of each of the phased array antennas 1-1 to 1-N, so that weights of all the element antennas 3-1 to 3-16 are set to "1".

In this case, the beam width formed by one sub-array 2 becomes the narrowest. For example, when the weights of the element antennas other than the four element antennas 3-6, 3-7, 3-10, and 3-11 arranged at the center of one sub-array 2 are changed to "0.5", the width of a beam formed by a single sub-array 2 widens.

It is assumed that the sub-array number determinator 41 has been recognized the width of a beam formed by a single sub-array 2, which is obtained in a condition where the weights of all the element antennas 3-1 to 3-16 are set to "1". In other words, it is assumed that the beam width in the azimuth angle direction and the beam width in the elevation angle direction of a beam formed by a single sub-array 2 are recognized. In the example of FIG. 4, since the element antennas 3-1 to 3-16 of 4×4 array are arranged at equal intervals, the beam width in the azimuth angle direction and the beam width in the elevation angle direction are the same.

The beam width in the azimuth angle direction is represented by a spread angle $\varphi_{AZ}$ in the azimuth angle direction. The beam width in the elevation angle direction is represented by a spread angle $\varphi_{EL}$ in the elevation angle direction.

In the Embodiment 1, in order to enhance the separation performance between the two user terminals $T_1$ and $T_2$ adjacent to each other, twice the width from the center of a beam to a first null is defined as the beam width. Alternatively, twice the width from the center of a beam to a position where power decreases by 3 dB may be defined as the beam width.

Determination of the number of sub-arrays in the azimuth angle direction will be described.

Upon specifying the viewing angle $\theta_{AZ}$ in the azimuth angle direction as the angular difference θ between the two user terminals $T_1$ and $T_2$ viewed from the antenna apparatus, the sub-array number determinator 41 compares the specified viewing angle $\theta_{AZ}$ with the spread angle $\varphi_{AZ}$ in the azimuth angle direction corresponding to the beam width in the azimuth angle direction of the beam formed by one sub-array 2.

When the viewing angle $\theta_{AZ}$ in the azimuth angle direction is the same as the spread angle $\varphi_{AZ}$ in the azimuth angle direction ($\theta_{AZ}=\varphi_{AZ}$) or is larger than the spread angle $\varphi_{AZ}$ in the azimuth angle direction ($\theta_{AZ}>\varphi_{AZ}$), the beams for the user terminals $T_1$ and $T_2$ do not interfere with each other even when the number of sub-arrays 2 to be allocated to each of the user terminals $T_1$ and $T_2$ is one. Therefore, in this case, the sub-array number determinator 41 determines that the number of sub-arrays 2 to be allocated to each of the user terminals $T_1$ and $T_2$ is one.

Assuming that the number of sub-arrays 2 to be allocated to each of the user terminals $T_1$ and $T_2$ is set to one when the viewing angle $\theta_{AZ}$ in the azimuth angle direction is smaller than the spread angle $\varphi_{AZ}$ in the azimuth angle direction ($\theta_{AZ}<\varphi_{AZ}$), the beams for the user terminals $T_1$ and $T_2$ may interfere with each other. In this case, the sub-array number determinator 41 determines that it is necessary to narrow the beams for the user terminals $T_1$ and $T_2$.

The sub-array number determinator 41 has been stored a spread angle $\varphi_{AZ-m}$ in the azimuth angle direction, which corresponds to the beam width in the azimuth angle direction and is obtained in a condition where the number of sub-arrays 2 in the azimuth angle direction is set to m (m=2, 3, and 4). The sub-array number determinator 41 determines the number m of sub-arrays 2 in the azimuth angle direction by specifying the minimum m from among m=2, 3, and 4, which enables the viewing angle $\theta_{AZ}$ in the azimuth angle direction to be equal to or greater than the spread angle $\varphi_{AZ-m}$ in the azimuth angle direction.

For example, when the viewing angle $\theta_{AZ}$ in the azimuth angle direction is equal to or greater than the spread angle $\varphi_{AZ-2}$ in the azimuth angle direction in a case of m=2, the number of sub-arrays 2 to be allocated to each of the user terminals $T_1$ and $T_2$ is determined as "2".

For another example, when the viewing angle $\theta_{AZ}$ in the azimuth angle direction becomes smaller than the spread angle $\varphi_{AZ-2}$ in the azimuth angle direction in a case of m=2 while the viewing angle $\theta_{AZ}$ in the azimuth angle direction is equal to or greater than the spread angle $\varphi_{AZ-3}$ in the azimuth angle direction in a case of m=3, the number of sub-arrays 2 to be allocated to each of the user terminals $T_1$ and $T_2$ is determined as "3".

Next, determination of the number of sub-arrays in the elevation angle direction is described.

Upon the viewing angle $\theta_{EL}$ in the elevation angle direction is specified as the angular difference $\theta$ between the two user terminals $T_1$ and $T_2$ viewed from the antenna apparatus, the sub-array number determinator 41 compares the specified viewing angle $\theta_{EL}$ with the spread angle $\varphi_{EL}$ in the elevation angle direction corresponding to the beam width in the elevation angle direction of the beam formed by one sub-array 2.

When the viewing angle $\theta_{EL}$ in the elevation angle direction is the same as the spread angle $\varphi_{EL}$ in the elevation angle direction ($\theta_{EL}=\varphi_{EL}$) or greater than the spread angle $\varphi_{EL}$ in the elevation angle direction ($\theta_{EL}>\varphi_{EL}$), the beams for the user terminals $T_1$ and $T_2$ do not interfere with each other even when the number of sub-arrays 2 to be allocated to each of the user terminals $T_1$ and $T_2$ is one. Therefore, in this case, the sub-array number determinator 41 determines that the number of sub-arrays 2 to be allocated to each of the user terminals $T_1$ and $T_2$ is one.

Assuming that the number of sub-arrays 2 to be allocated to each of the user terminals $T_1$ and $T_2$ is set to one when the viewing angle $\theta_{EL}$ in the elevation angle direction is smaller than the spread angle $\varphi_{EL}$ in the elevation angle direction ($\theta_{EL}<\varphi_{EL}$), the beams for the user terminals $T_1$ and $T_2$ interfere with each other. In this case, the sub-array number determinator 41 determines that it is necessary to narrow the beams for the user terminals $T_1$ and $T_2$.

The sub-array number determinator 41 has been stored the spread angle $\varphi_{EL-m}$ in the elevation angle direction, which corresponds to the beam width in the elevation angle direction and is obtained in a condition where the number of sub-arrays 2 in the elevation angle direction is set to m (m=2, 3, and 4). The sub-array number determinator 41 determines the number m of the sub-arrays 2 in the elevation angle direction by specifying the minimum m from among m=2, 3, and 4, which enables the viewing angle $\theta_{EL}$ in the elevation angle direction to be equal to or greater than the spread angle $\varphi_{EL-m}$ in the elevation angle direction.

For example, when the viewing angle $\theta_{EL}$ in the elevation angle direction is equal to or greater than the spread angle $\varphi_{EL-2}$ in the elevation angle direction in a case of m=2, the number of sub-arrays 2 to be allocated to each of the user terminals $T_1$ and $T_2$ is determined as "2".

For another example, when the viewing angle $\theta_{EL}$ in the elevation angle direction becomes smaller than the spread angle $\varphi_{EL-2}$ in the elevation angle direction in a case of m=2 while the viewing angle $\theta_{EL}$ in the elevation angle direction becomes equal to or greater than the spread angle $\varphi_{EL-3}$ in the elevation angle direction in a case of m=3, the number of sub-arrays 2 to be allocated to each of the user terminals $T_1$ and $T_2$ is determined as "".

Figure 6:
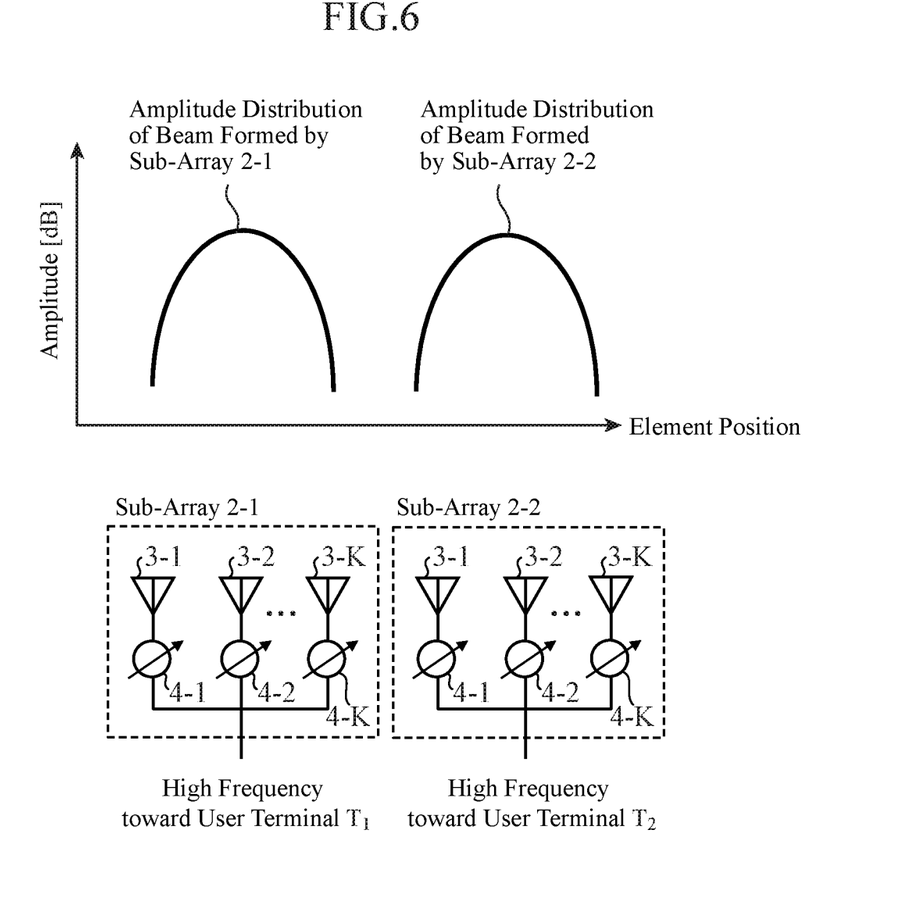
FIG. 6 is an illustration diagram illustrating amplitude distribution of beams formed by sub-arrays 2-1 and 2-2 when the sub-array 2-1 is allocated to a user terminal $T_1$ and the sub-array 2-2 is allocated to a user terminal $T_2$.

FIG. 6 is an illustration diagram illustrating amplitude distribution of the beams formed by the sub-arrays 2-1 and 2-2 when the sub-array 2-1 is allocated to the user terminal $T_1$ and the sub-array 2-2 is allocated to the user terminal $T_2$.

Figure 7:
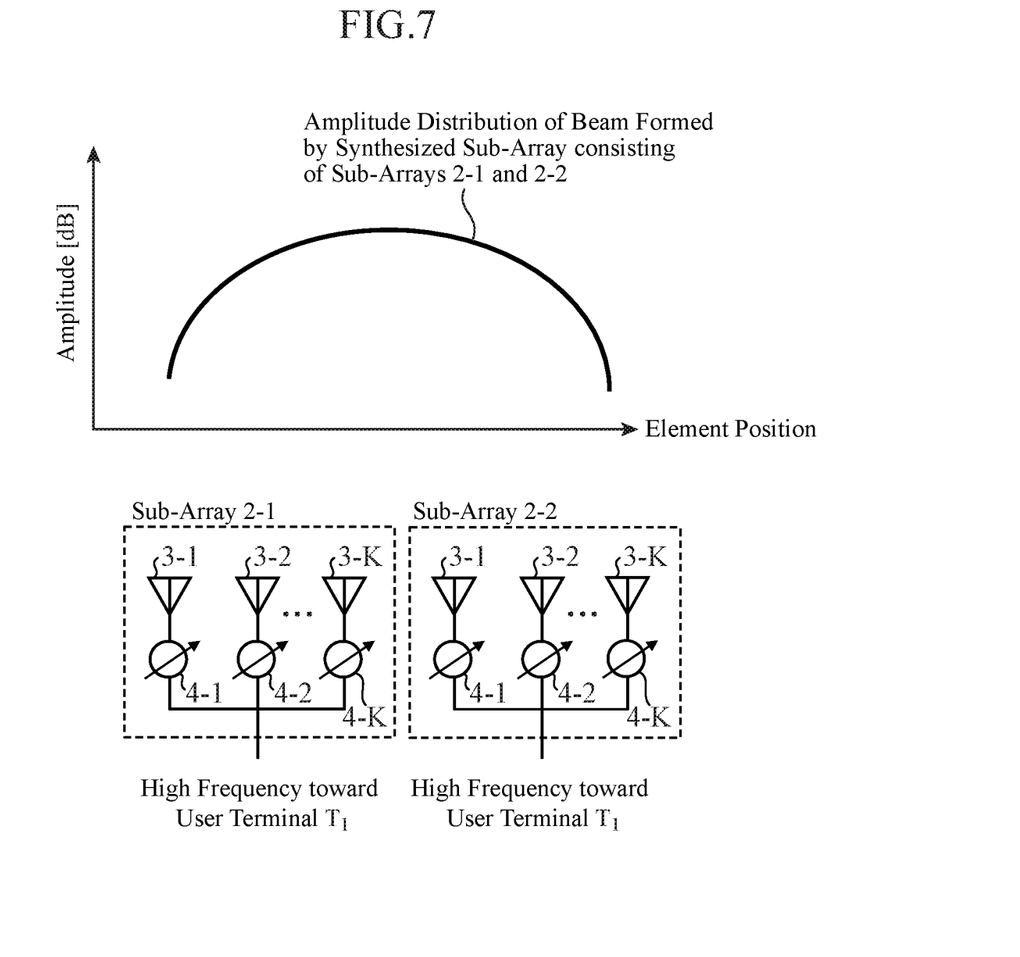
FIG. 7 is an illustration diagram illustrating amplitude distribution of the beam formed by a synthesized sub-array of the sub-arrays 2-1 and 2-2 when sub-arrays 2-1 and 2-2 are allocated to the user terminal $T_1$.

FIG. 7 is an illustration diagram illustrating amplitude distribution of the beam formed by a synthesized sub-array of the sub-arrays 2-1 and 2-2 when the sub-arrays 2-1 and 2-2 are allocated to the user terminal $T_1$.

Note that, in FIGS. 6 and 7, in order to simplify the description, attention is focused on the azimuth angle direction, and the elevation angle direction is not illustrated.

When the sub-array number determinator 41 determines that the number of sub-arrays 2 to be allocated to each of the two user terminals $T_1$ and $T_2$ is one, the beam formed by the sub-array 2-1 is set for the user terminal $T_1$ while the beam formed by the sub-array 2-2 is set for the user terminal $T_2$, as illustrated in FIG. 6. The two beams set for the user terminals $T_1$ and $T_2$ are independent from each other.

Therefore, the antenna apparatus can start the individual data communication with the user terminal $T_1$ by using the beam formed by the sub-array 2-1 and also start the individual data communication with the user terminal $T_2$ by using the beam formed by the sub-array 2-2.

When the sub-array number determinator 41 determines that the number of sub-arrays 2 to be allocated to the user terminal $T_1$ is two, the beam formed by the synthesized sub-array of the sub-arrays 2-1 and 2-2 is set for the user terminal $T_1$, as illustrated in FIG. 7.

Therefore, the antenna apparatus can start the data communication with the user terminal $T_1$ by using the beam formed by a synthesized sub-array consisting of the sub-arrays 2-1 and 2-2.

Since attention is focused on the azimuth angle direction, an example is herein illustrated in which the sub-arrays 2-1 and 2-2 arranged in the azimuth angle direction are selected. Equivalently, for example, when the number of sub-arrays in the elevation angle direction is set to two, there may be a case in which the sub-arrays 2-1 and 2-5, which are arranged in the elevation angle direction, are selected.

After the sub-array number determinator 41 determines the number of sub-arrays 2 in the azimuth angle direction and that in the elevation angle direction, the antenna selector 50 selects the sub-arrays 2 for the number determined by the sub-array number determinator 41 from among the sub-arrays 2-1 to 2-N and allocates the selected sub-arrays 2 to each of the two user terminals $T_1$ and $T_2$ (step ST3).

For example, when the number of sub-arrays 2 for each of the azimuth angle direction and the elevation angle direction is one, there may be a mode in which the sub-array 2-1 is allocated to the user terminal $T_1$ while the sub-array 2-3 is allocated to the user terminal $T_2$. Note that arbitrary ones in the sub-array 2 may be allocated to the two user terminals $T_1$ and $T_2$. For example, there may be a mode in which the sub-array 2-1 is allocated to the user terminal $T_1$ while the sub-array 2-16 is allocated to the user terminal $T_2$.

When the number of sub-arrays 2 for each of the azimuth angle direction and the elevation angle direction is two, there may be a mode in which the sub-arrays 2-1, 2-2, 2-5, and 2-6 are allocated to the user terminal $T_1$ while the sub-arrays 2-3, 2-4, 2-7, and 2-8 are allocated to the user terminal $T_2$. Note that arbitrary ones in the sub-array 2 may be allocated to the two user terminals $T_1$ and $T_2$. For example, there may be a mode in which the sub-arrays 2-1, 2-2, 2-5, and 2-6 are allocated to the user terminal $T_1$ while the sub-arrays 2-11, 2-12, 2-15, and 2-16 are allocated to the user terminal $T_2$.

After the antenna selector 50 allocates the sub-arrays 2 for the number determined by the sub-array number determinator 41 to each of the two user terminals $T_1$ and $T_2$, the amplitude/phase adjuster 42 determines adjustment amounts of the user signal amplitude adjuster 23 and the user signal phase adjuster 22 in the user signal processor 20, which corresponds to the sub-arrays 2 allocated to the user terminals $T_1$ and $T_2$ (Step ST4). The amplitude/phase adjuster 42 also determines adjustment amounts of the amplitude adjuster 4 and the phase shifter 5, which are connected to the sub-arrays 2 allocated to the user terminals $T_1$ and $T_2$ (step ST5).

Hereinafter, the processing contents of the amplitude/phase adjuster 42 are specifically described.

Herein, it is considered that, for example, the number of sub-arrays 2 determined by the sub-array number determinator 41 is two and the sub-array 2-1 and the sub-array 2-2 are allocated to a single user terminal $T_1$.

At that time, assuming that a distance between the user terminal $T_1$ and the sub-array 2-1 is not the same as a distance between the user terminal $T_1$ and the sub-array 2-2, and also assuming that the amplitude and phase of the signal transmitted by the sub-array 2-1 are the same as the amplitude and phase of the signal transmitted by the sub-array 2-2, the signal transmitted by the sub-array 2-1 and the signal transmitted by the sub-array 2-2 are not in phase in the direction of the user terminal $T_1$ due to influence of difference in distance.

Therefore, the amplitude/phase adjuster 42 determines the adjustment amounts of the user signal amplitude adjuster 23 and the user signal phase adjuster 22 in the user signal processor 20-1 corresponding to the sub-array 2-1 and also determines the adjustment amounts of the user signal amplitude adjuster 23 and the user signal phase adjuster 22 in the user signal processor 20-2 corresponding to the sub-array 2-2 in dependence on the difference in distance, such that the signal transmitted by the sub-array 2-1 and the signal transmitted by the sub-array 2-2 are in phase even when there is the difference in distance. Note that a process of determining the adjustment amount in accordance with the difference in distance itself is the well-known technology, so that detailed description thereof is omitted.

When the number of sub-arrays 2 determined by the sub-array number determinator 41 is one, it is not necessary to consider the effect of the difference in distance. In this case, the amplitude/phase adjuster 42 does not determine the adjustment amounts of the user signal amplitude adjuster 23 and the user signal phase adjuster 22.

Therefore, the user signal amplitude adjuster 23 adjusts the amplitude of the signal by an amplitude adjustment amount set in advance, and the user signal phase adjuster 22 adjusts the phase of the signal by a phase adjustment amount set in advance.

The amplitude/phase adjuster 42 determines the adjustment amounts of the phase shifters 5-1 to 5-$k$ of the phased array antenna 1, on which the sub-array 2 is mounted, such that the beam formed by the sub-array 2 allocated to the user terminal $T_1$ is directed toward the user terminal $T_1$.

For example, when the sub-array 2 allocated to the user terminal $T_1$ is the sub-array 2-1, the adjustment amounts of the phase shifters 5-1 to 5-$k$ of the phased array antenna 1-1 are determined. For another example, when the sub-arrays 2 allocated to the user terminal $T_1$ are the sub-arrays 2-1, 2-2, 2-5, and 2-6, the adjustment amounts of the phase shifters 5-1 to 5-$k$ of each of the phased array antennas 1-1, 1-2, 1-5, and 1-6 are determined.

The amplitude/phase adjuster 42 determines the adjustment amounts of the phase shifters 5-1 to 5-$k$ of the phased array antenna 1, on which the sub-array 2 is mounted, such that the beam formed by the sub-array 2 allocated to the user terminal $T_2$ is directed toward the user terminal $T_2$.

For example, when the sub-array 2 allocated to the user terminal $T_2$ is the sub-array 2-2, the adjustment amounts of the phase shifters 5-1 to 5-$k$ of the phased array antenna 1-2 are determined. For another example, when the sub-arrays 2 allocated to the user terminal $T_2$ are the sub-arrays 2-3, 2-4, 2-7, and 2-8, the adjustment amounts of the phase shifters 5-1 to 5-$k$ of each of the phased array antennas 1-3, 1-4, 1-7, and 1-8 are determined.

In the Embodiment 1, it is assumed that the amplitude/phase adjuster 42 controls the amplitude adjusters 4-1 to 4-K so that the weights of all the signals transmitted/received by the element antennas 3-1 to 3-K, which constitute each of the sub-arrays 2-1 to 2-16, will be set to "1". Alternatively, when a plural sub-arrays 2 is allocated to each of the user terminal $T_1$ and $T_2$, it is possible to determine the adjustment amounts of the amplitude adjusters 4-1 to 4-K connected to the element antennas 3-1 to 3-K constituting each of a plurality of sub-arrays 2, respectively, in dependence on the viewing angle $\theta_{AZ}$ in the azimuth angle direction and the viewing angle $\theta_{EL}$ in the elevation angle direction so that the spread angle $\varphi_{AZ}$ in the azimuth angle direction and the spread angle $\varphi_{EL}$ in the elevation angle direction corresponding to the width of the beam formed by the synthesized sub-array of the sub-arrays 2 will match the viewing angle $\theta_{AZ}$ in the azimuth angle direction and the viewing angle $\theta_{EL}$ in the elevation angle direction.

As described above, the width of the beam formed by the synthesized sub-array of a plurality of sub-arrays 2 is narrower than the width of the beam formed by one sub-array 2. Thus, there is a case in which the spread angle $\varphi_{AZ}$ in the azimuth angle direction and the spread angle $\varphi_{EL}$ in the elevation angle direction corresponding to the width of the beam formed by the synthesized sub-array become narrower than the viewing angle $\theta_{AZ}$ in the azimuth angle direction and the viewing angle $\theta_{EL}$ in the elevation angle direction, respectively.

The narrower the width of the beam formed by the synthesized sub-array, the separation performance of the user terminal is improved. However, the communication coverage may be expanded within a range where the beams do not interfere with each other by determining the adjustment amounts of the amplitude adjusters 4-1 to 4-K so that the spread angle $\varphi_{AZ}$ in the azimuth angle direction and the spread angle $\varphi_{EL}$ in the elevation angle direction corresponding to the width of the beam formed by the synthesized sub-array will match the viewing angle $\theta_{AZ}$ in the azimuth angle direction and the viewing angle $\theta_{EL}$ in the elevation angle direction, respectively.

When the process described above is completed, the data communication with the user terminals $T_1$ and $T_2$ is started.

Next, the processing contents in a case where the antenna apparatus transmits the high-frequency signal to the user terminal $T_1$ are described.

Herein, for convenience of description, it is assumed that the sub-arrays 2-1 and 2-2 are allocated to the user terminal $T_1$ by the antenna selector 50. Also, it is assumed that the user signal processor 20 corresponding to the user terminal $T_1$ is the user signal processor 20-1.

The transmitter 21 of the user signal processor 20-1 generates the modulated signal, on which the data for the user terminal $T_1$ has been superimposed, and outputs the modulated signal.

Upon receiving the modulated signal from the transmitter 21, the user signal phase adjuster 22 of the user signal processor 20-1 distributes the modulated signal into two signals and adjusts the phases of the two modulated signals by the adjustment amount determined by the amplitude/phase adjuster 42. Note that the distribution of the modulated signal into the two signals is intended to copy the modulated signal to generate the two identical modulated signals.

Upon receiving the two modulated signals after the phase adjustment from the user signal phase adjuster 22, the user signal amplitude adjuster 23 of the user signal processor 20-1 adjusts the amplitude of the two modulated signals by the adjustment amount determined by the amplitude/phase adjuster 42 and outputs to the antenna selector 50 the two modulated signals after the amplitude adjustment.

Upon receiving the two modulated signals after the amplitude and phase adjustment from the user signal processor 20-1, since the sub-arrays 2-1 and 2-2 are allocated as the sub-arrays 2 for the user terminal $T_1$, the antenna selector 50 outputs to the phased array antenna 1-1 one of the two modulated signals after the amplitude and phase adjustment and outputs the other modulated signal to the phased array antenna 1-2.

Upon receiving the modulated signal from the antenna selector 50, the frequency converter 7 of each of the phased array antennas 1-1 and 1-2 converts the modulated signal into the analog signal and converts the analog signal into the high-frequency signal.

Although an example in which the modulated signal is converted into the analog signal before the conversion into the high-frequency signal is herein illustrated, it is alternatively possible to convert the modulated signal into the analog signal after the conversion into the high-frequency signal.

Upon receiving the high-frequency signal from the frequency converter 7, the synthesizer/distributor 6 of each of the phased array antennas 1-1 and 1-2 distributes the high-frequency signal into K signals and outputs to the phase shifters 5-1 to 5-K the high-frequency signals after the distribution.

Upon receiving the high-frequency signal from the synthesizer/distributor 6, the phase shifters 5-1 to 5-K of each of the phased array antennas 1-1 and 1-2 adjust the phase of the high-frequency signal by the adjustment amount determined by the amplitude/phase adjuster 42 and output to the amplitude adjusters 4-1 to 4-K the high-frequency signal after the phase adjustment.

Upon receiving the high-frequency signal after the phase adjustment from the phase shifters 5-1 to 5-K, the amplitude adjusters 4-1 to 4-K of each of the phased array antennas 1-1 and 1-2 adjust the amplitude of the high-frequency signal by the adjustment amount determined by the amplitude/phase adjuster 42 and output to the element antennas 3-1 to 3-K the high-frequency signal after the amplitude adjustment.

Through the above process, the high-frequency signals after the amplitude and phase adjustment are emitted from the element antennas 3-1 to 3-K of each of the phased array antennas 1-1 and 1-2 to the user terminal $T_1$.

Next, the processing contents in a case where the antenna apparatus receives the high-frequency signal transmitted by the user terminal $T_1$ is described.

Herein, for convenience of description, it is assumed that the sub-arrays 2-1 and 2-2 are allocated to the user terminal $T_1$ by the antenna selector 50. Also, it is assumed that the user signal processor 20 corresponding to the user terminal $T_1$ is the user signal processor 20-1.

The user terminal $T_1$ transmits the high-frequency signal on which the data has been superimposed.

The element antennas 3-1 to 3-K of each of the phased array antennas 1-1 and 1-2 receive the high-frequency signal transmitted by the user terminal $T_1$.

When the element antennas 3-1 to 3-K receive the high-frequency signal, the amplitude adjusters 4-1 to 4-K of each of the phased array antennas 1-1 and 1-2 adjust the amplitude of the high-frequency signal by the adjustment amount determined by the amplitude/phase adjuster 42 and outputs to the phase shifters 5-1 to 5-K the high-frequency signal after the amplitude adjustment.

Upon receiving the high-frequency signal after the amplitude adjustment from the amplitude adjusters 4-1 to 4-K, the phase shifters 5-1 to 5-K of each of the phased array antennas 1-1 and 1-2 adjust the phase of the high-frequency signal by the adjustment amount determined by the amplitude/phase adjuster 42 and output to the synthesizer/distributor 6 the high-frequency signal after the phase adjustment.

Upon receiving the high-frequency signals after the phase adjustment from the phase shifters 5-1 to 5-K, the synthesizer/distributor 6 of each of the phased array antennas 1-1 and 1-2 synthesizes the K high-frequency signals and outputs to the frequency converter 8 the synthesized signal being the synthesized high-frequency signal.

Upon receiving the synthesized signal from the synthesizer/distributor 6, the frequency converter 8 of each of the phased array antennas 1-1 and 1-2 performs the frequency conversion process of converting the frequency of the synthesized signal into the intermediate frequency, performs the A/D conversion process of converting the synthesized signal after the frequency conversion into the digital signal, and outputs to the antenna selector 50 the reception signal being the digital synthesized signal.

Although an example in which the synthesized signal is converted into the digital signal after the conversion of the frequency of the synthesized signal into the intermediate frequency is herein illustrated, it is possible to convert the synthesized signal is converted into the digital signal before the conversion of the frequency of the synthesized signal into the intermediate frequency.

Upon receiving the reception signal from the frequency converter 8 of each of the phased array antennas 1-1 and 1-2, the antenna selector 50 outputs those two reception signals to the user signal processor 20-1 because this user signal processor 20-1 corresponds to the user terminal $T_1$.

Upon receiving the two reception signals from the antenna selector 50, the user signal amplitude adjuster 23 of the user signal processor 20-1 adjusts the amplitude of the two reception signals by the adjustment amount determined by the amplitude/phase adjuster 42 and outputs to the user signal phase adjuster 22 the two reception signals after the amplitude adjustment.

Upon receiving the two reception signals after the amplitude adjustment from the user signal amplitude adjuster 23, the user signal phase adjuster 22 of the user signal processor 20-1 adjusts the phases of the two reception signals by the adjustment amount determined by the amplitude/phase adjuster 42, synthesizes the two reception signals after the phase adjustment, and outputs the synthesized reception signal to the receiver 24.

Upon receiving the synthesized reception signal from the user signal phase adjuster 22, the receiver 24 of the user signal processor 20-1 demodulates the data by performing a demodulating process on the reception signal.

In the Embodiment 1, when the viewing angle $\theta_{AZ}$ in the azimuth angle direction between the two user terminals $T_1$ and $T_2$ is smaller than the spread angle $\varphi_{AZ}$ in the azimuth angle direction ($\theta_{AZ} < \varphi_{AZ}$), the number of sub-arrays 2 in the azimuth angle direction to be allocated to each of the user terminals $T_1$ and $T_2$ is set to two or more. In addition, when the viewing angle $\theta_{EL}$ in the elevation angle direction between the two user terminals $T_1$ and $T_2$ is smaller than the spread angle $\varphi_{EL}$ in the elevation angle direction ($\theta_{EL} < \varphi_{EL}$), the number of sub-arrays 2 in the elevation angle direction to be allocated to each of the user terminals $T_1$ and $T_2$ is set to two or more. Alternatively, for example, when the distance from the antenna apparatus to the user terminal $T_1$ is equal to or greater than a threshold, the number of sub-arrays 2 in the azimuth angle direction and the number of sub-arrays 2 in the elevation angle direction to be allocated to the user terminal $T_1$ may be respectively set to two or more regardless of whether or not the conditions of ($\theta_{AZ} < \varphi_{AZ}$) and ($\theta_{EL} < \varphi_{EL}$) are satisfied.

According to this alternative, since a communicable distance becomes longer, the data communication may be started even when the user terminal $T_1$ is located far from the antenna apparatus.

In addition, in order to improve the terminal separation performance, the Embodiment 1 discloses an example in which the beam width in the azimuth angle direction is narrowed by setting the number of sub-arrays 2 in the azimuth angle direction to be allocated to each of the user terminals $T_1$ and $T_2$ to two or more, and an example in which the beam width in the elevation angle direction is narrowed by setting the number of sub-arrays 2 in the elevation angle direction to be allocated to each of the user terminals $T_1$ and $T_2$ to two or more. However, when the distance between the user terminal $T_1$ and the user terminal $T_2$ is extremely short, it may be impossible to separate the user terminals $T_1$ and $T_2$ from each other and take charge of the user terminals $T_1$ and $T_2$ at the same time even if the number of sub-arrays 2 in the azimuth angle direction and the elevation angle direction is set to the maximum.

In that case, it is possible to prevent decrease in system throughput by employing a method of controlling a frequency of the beam for the user terminal $T_1$ to be different from that of the beam for the user terminal $T_2$, or a method of making schedules for the user terminals $T_1$ and $T_2$ not to simultaneously use the beams.

As is cleared by the above description, according to the Embodiment 1, it is configured to provide the sub-array number determinator 41 which determines the number of sub-arrays to be allocated to each of user terminals on a basis of the relation between the positions of the user terminals detected by the terminal position detector 32 and the position of the antenna apparatus, and the antenna selector 50 which selects the sub-arrays for the number determined by the sub-array number determinator 41 from among the sub arrays 2-1 to 2-N and allocates the selected sub-arrays to each of the user terminals. Therefore, there is an effect of providing an excellent communication quality to the user terminals.

That is, it is possible to obtain the antenna apparatus with a high degree of freedom capable of improving the terminal separation performance for the user terminals and expanding the communication coverage.

Embodiment 2

In the Embodiment 1, the example in which the element antennas 3-1 to 3-K are constituted by the patch antennas and the like is described. Alternatively, it is possible that they are constituted by orthogonal polarization shared elements, each of which has a feeding point V for orthogonal polarization and a feeding point H for horizontal polarization.

Figure 8:
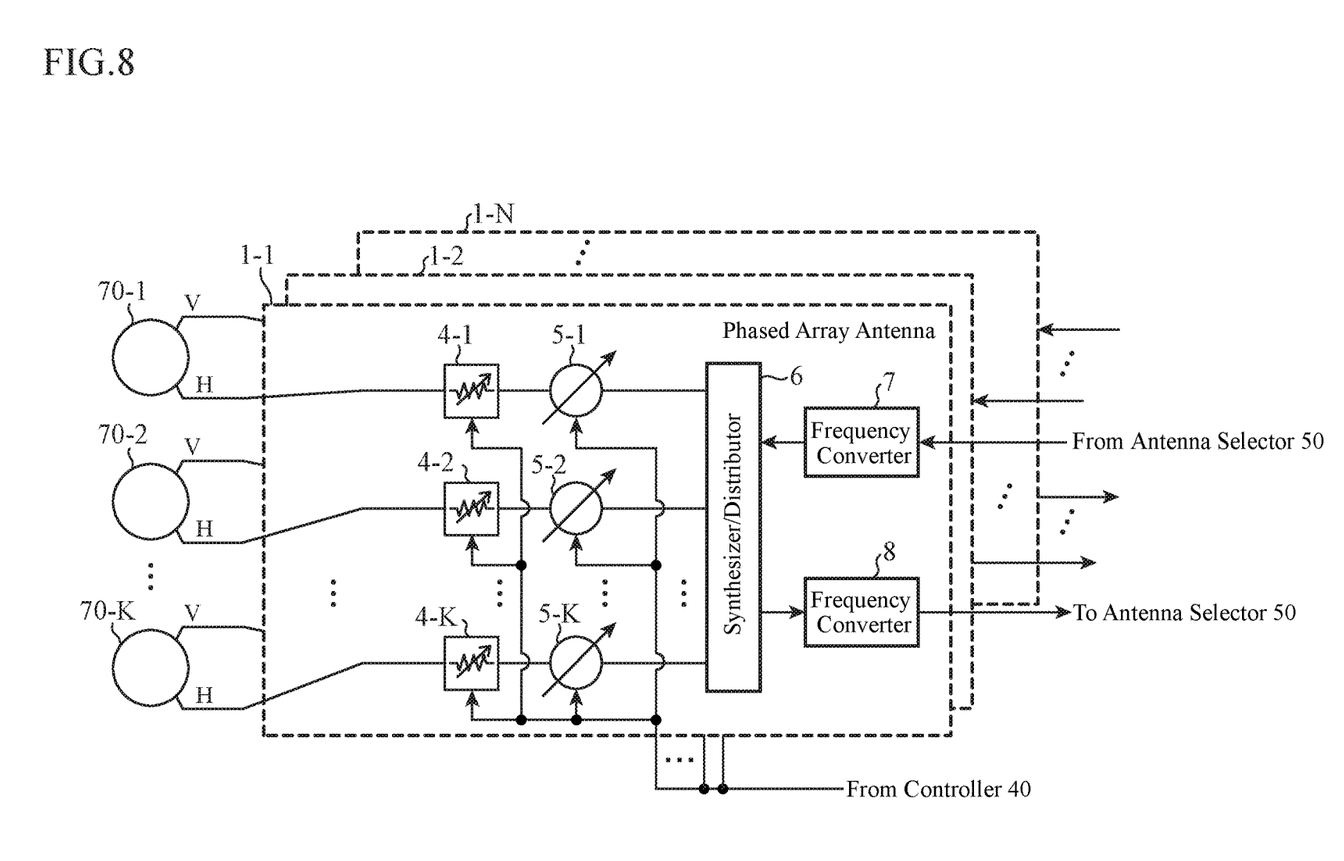
FIG. 8 is a configuration diagram illustrating part of an antenna apparatus according to Embodiment 2 of the present invention.

FIG. 8 is a configuration diagram illustrating part of an antenna apparatus according to Embodiment 2 of the present invention. In FIG. 8, the same reference numeral as that in FIG. 1 represents the same or corresponding portion, so that the description thereof is omitted.

Orthogonal polarization shared elements 70-1 to 70-K are element antennas provided with the feeding point V for the orthogonal polarization and the feeding point H for the horizontal polarization.

The orthogonal polarization shared element 70-$k$, whose feeding point H for the horizontal polarization is connected to an amplitude adjuster 4-$k$ ($k=1, 2, \ldots, K$) of a phased array antenna 1-$n$ ($n=1, 3, \ldots, N-1$), is connected to the amplitude adjuster 4-$k$ of the phased array antenna 1-$(n+1)$ at the feeding point V for the orthogonal polarization.

Therefore, in the Embodiment 2, the phased array antenna 1-$n$ and the phased array antenna 1-$(n+1)$ form a pair.

The element antennas such as the orthogonal polarization shared elements 70-1 to 70-K may be realized by a structure in which two feeding points are provided in, for example, a microstrip antenna, a cross dipole antenna, a tapered slot antenna and the like.

Signals input/output through the feeding points H for the horizontal polarization are weighted and synthesized by the phased array antennas 1-$n$. Signals input/output through the feeding points V for the orthogonal polarization are weighted and synthesized by the phased array antennas 1-$(n+1)$.

The Embodiment 2 is similar to the above-described Embodiment 1 except that the orthogonal polarization shared elements 70-1 to 70-K are provided in place of element antennas 3-1 to 3-K, respectively. Therefore, processing contents of the antenna apparatus are the same as those in the Embodiment 1.

In the Embodiment 2, it is capable of taking charge of user terminals by using the orthogonal polarization and horizontal polarization, so that the user terminals as many as those in the above-described Embodiment 1 may be taken charge even if the number of element antennas is reduced by half.

Therefore, by allocating orthogonal polarization to different beams, an antenna scale may be reduced as compared with that of the Embodiment 1.

Although an example is illustrated in the Embodiment 2 to take charge of the user terminal by using the orthogonal polarization and the horizontal polarization, it is alternatively possible to take charge of the user terminal by using circular polarization.

For example, when it is constituted such that both polarization output signals of the orthogonal polarization shared element 70-$k$ are input to a 90-degree hybrid circuit, a right-handed circular polarization component and a left-handed circular polarization component are output from output terminals of the 90-degree hybrid circuit. Therefore, such structure may serve as a shared antenna of the right-handed circular polarization and left-handed circular polarization.

Note that the means for exciting the circular polarization is not limited to the 90-degree hybrid circuit, and any means may be used as long as the means may output the circular polarization.

In the invention of the present application, embodiments may be freely combined, an arbitrary component of each embodiment may be modified, or an arbitrary component may be omitted in each embodiment without departing from the scope of the invention.

The antenna apparatus according to the present invention is suitable for apparatus required to provide the excellent communication quality by preventing the interference between the beams for user terminals even in condition where the user terminals is adjacent to each other.

REFERENCE SIGNS LIST 1-1 to 1-N: Phased array antenna, 2-2 to 2-N: Sub-array, 3-1 to 3-K: Element antenna, 4-1 to 4-K: Amplitude adjuster, 5-1 to 5-K: Phase shifter, 6: Synthesizer/distributor, 7: Frequency converter, 8: Frequency converter, 20-1 to 20-J: User signal processor, 21: Transmitter, 22: User signal phase adjuster, 23: User signal amplitude adjuster, 30: User information recognizer, 31: Communication link establisher, 32: Terminal position detector, 40: Controller, 41: Sub-array number determinator, 42: Amplitude/phase adjuster, 50: Antenna selector, 61: Memory, 62: Processor, 70-1 to 70-K: Orthogonal polarization shared element

The invention claimed is:

1. An antenna apparatus comprising:
a plurality of sub-arrays (2-$n$: n=1, . . . , N) each of which is constituted by a plurality of element antennas (3-$k$: k=1, . . . , K);
a terminal position detector (32) to detect positions of a plurality of user terminals being communication objects;
a sub-array number determinator (41) to determine a number of sub-arrays to be allocated to each of the plurality of user terminals detected by the terminal position detector (32) on a basis of relation between the positions of the plurality of user terminals and a position of the antenna apparatus; and
an antenna selector (50) to select sub-arrays for the number determined by the sub-array number determinator (41) from among the plurality of sub-arrays (2-$n$) and allocate the selected sub-arrays for the determined number to each of the plurality of user terminals.

2. The antenna apparatus according to claim 1, wherein the sub-array number determinator (41) is configured to
specify, on a basis of the relation between the positions of the plurality of user terminals detected by the terminal position detector (32) and the position of the antenna apparatus, angular difference between the plurality of user terminals viewed from the antenna apparatus, and
determine the number of sub-arrays to be allocated to each of the plurality of user terminals in dependence on the specified angular difference.

3. The antenna apparatus according to claim 2, wherein the sub-array number determinator (41) is configured to increase the number of sub-arrays to be allocated to each of the plurality of user terminals as the angular difference between the plurality of user terminals is smaller.

4. The antenna apparatus according to claim 2, further comprising an amplitude/phase adjuster (42) to adjust amplitude and a phase of a signal, which is transmitted or received by a sub-array (2-$n$) selected by the antenna selector (50), by controlling an amplitude adjuster (4-$k$) and a phase shifter (5-$k$) connected to a plurality of element antennas (3-$k$) constituting the selected sub-array (2-$n$).

5. The antenna apparatus according to claim 4, wherein the amplitude/phase adjuster (42) is configured to control the phase shifter (5-$k$) to direct a beam formed by the selected sub-array (2-$n$) toward a user terminal to which the selected sub-array (2-$n$) is allocated.

6. The antenna apparatus according to claim 4, wherein the amplitude/phase adjuster (42) is configured to control the amplitude adjuster (4-$k$) in dependence on the angular difference between the plurality of user terminals.

7. The antenna apparatus according to claim 1, wherein the element antennas (3-$k$) are orthogonal polarization shared elements (70-$k$) having a feeding point for vertical polarization and a feeding point for horizontal polarization.

* * * * *